Figure 1:
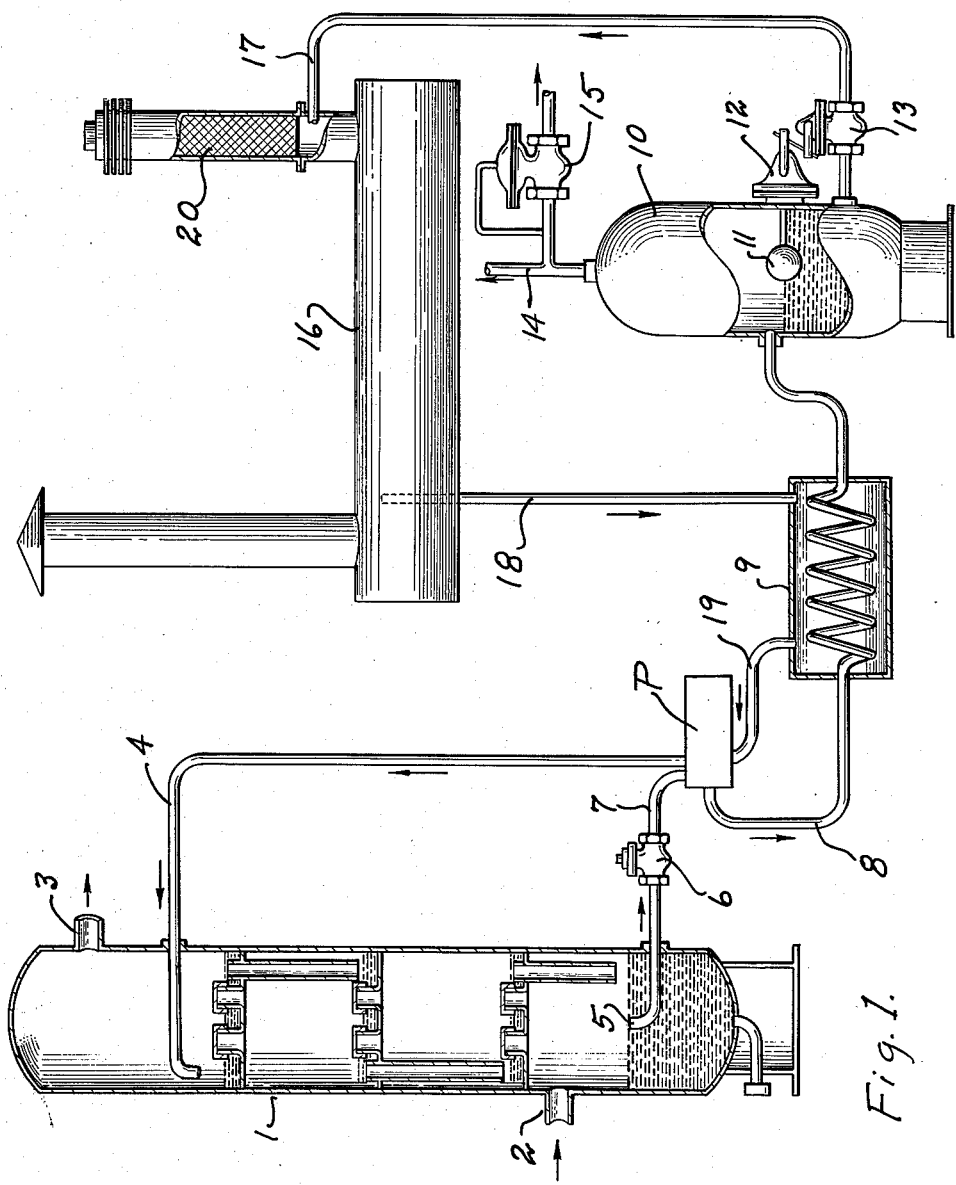

INVENTOR.
Garman O. Kimmell
BY Earl Babcock
attorney

United States Patent Office 2,990,910
Patented July 4, 1961

2,990,910
APPARATUS AND METHOD FOR CIRCULATING AND CONTROLLING LIQUIDS IN GAS-LIQUID SYSTEMS
Garman O. Kimmell, 52 NW. 42nd St., Oklahoma City, Okla.
Filed Apr. 1, 1957, Ser. No. 649,820
8 Claims. (Cl. 183—2)

This invention relates to an apparatus and method for controlling the level of a liquid in a gas-liquid system and for circulating liquid in a gas-liquid system, parts of which are under different pressures.

Many systems are in use in the oil field and in refineries for removing either desirable or undesirable constituents from gas. Such systems in more general use include liquid desiccant dehydrators for the removal of water vapor from gas, natural gasoline absorbers, and desulphurizers for the removal of undesirable hydrogen sulphide and mercaptans.

It is necessary in these systems to remove the absorbing liquid from the absorber, treat it by removing the absorbed constituent, and then return it to the absorber.

Ordinarily the absorber is operated at pressures well above atmospheric. On the other hand, treatment of the absorbing liquid usually takes place either at atmospheric pressure or at a pressure substantially reduced from that in the absorber. Considerable energy, therefore, is required to return the absorbing liquid to the absorber.

It is common practice to cause a drop in the pressure on the absorbing liquid from that in the absorber to that of the treating pressure by the use of a motor valve of a liquid level controller. This practice makes no use of the pressure-volume energy of the liquid in the absorber. The energy in the absorbent as well as the absorbed constituent is wasted. This lost energy must be supplied to a pump in order to return the absorbent to the absorber.

In larger systems, energy is supplied from an outside source, such as an engine or electric motor, but in smaller systems, located remotely in the field, pumping energy is obtained solely from the high pressure gas before or after treatment. This gas is, of necessity, discharged to the atmosphere, and wasted.

Use of the high pressure gas to pump the liquid in remote installations has been considered a necessary expedient and has been tolerated by producers and conservation commissions. A significant loss of natural resources, however, does result.

The system of the present invention has two important functions, that of circulating absorbing liquid in a cycle through a high pressure vessel and a low pressure vessel, and that of maintaining a proper liquid level in the high pressure vessel. These functions are attained with a minimum waste of energy, and with trouble-free equipment.

It is, therefore, one object of the present invention to provide an apparatus and a method for removing a constituent from a gas by which the pressure-volume energy of an absorbing liquid, plus the removed constituent, is utilized in a system of the type described to circulate the absorbing liquid.

Another object of the invention is to provide a system which, by reason of its use of both liquid and gas as power fluid, eliminates the necessity of a liquid level controller on the absorber.

A further object of the invention is to provide a system of the kind described which has no stuffing boxes or pressure barriers exposed to the atmosphere, thus eliminating the chance of loss of absorbing liquid.

Invention resides in accomplishing these and other objects, as hereinafter pointed out, and in the arrangement of parts, and the details of construction described and claimed, and in the apparatus used in the system.

Figure 2:
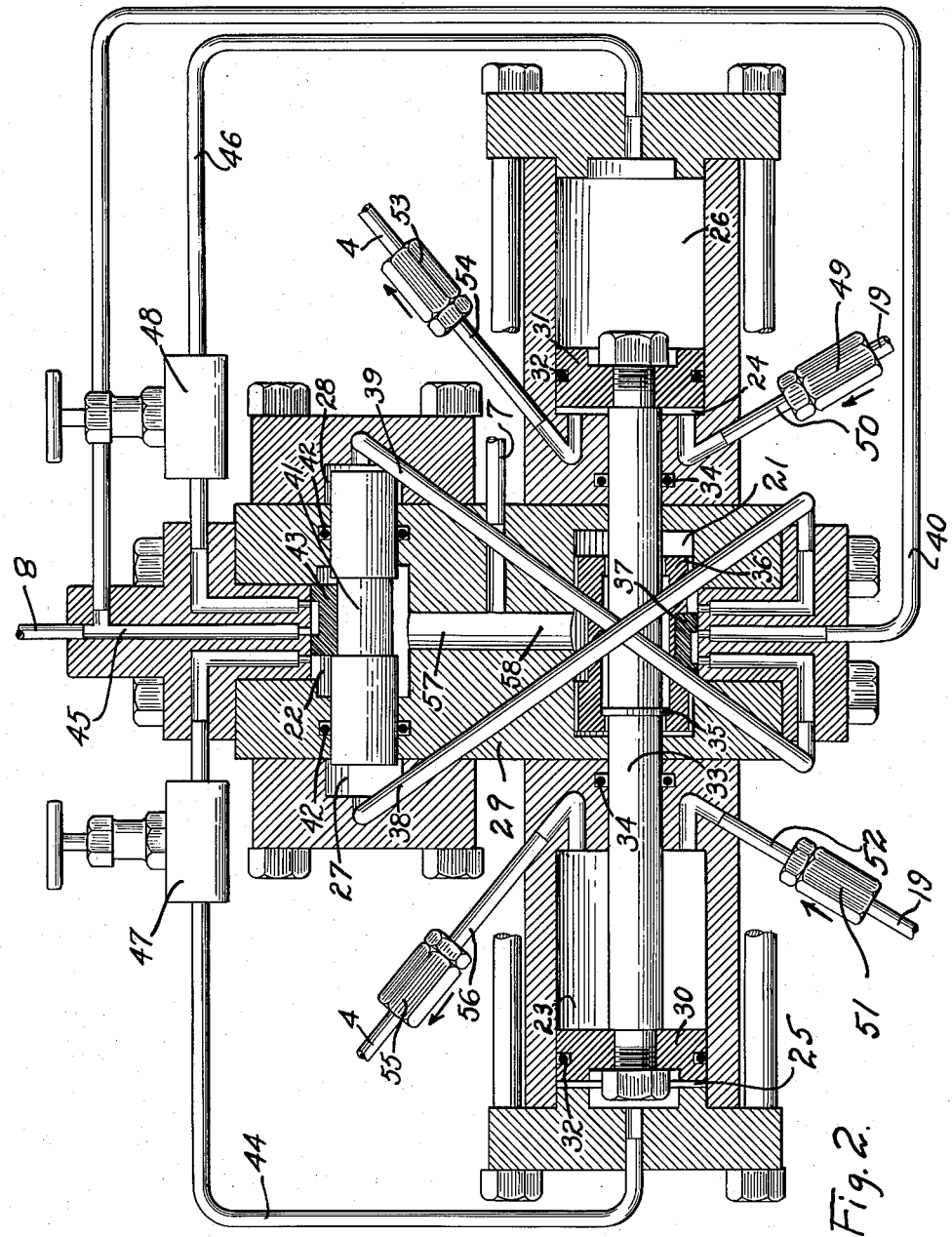

In the drawings, wherein like numerals of reference designate corresponding parts:

FIGURE 1 is a diagrammatic illustration of a system incorporating the invention, wherein glycol or other liquid desiccant is brought into contact with a gas for the removal of water vapor therefrom; and FIGURE 2 is a view in side elevation, and partly in cross section of a pump which forms a part of the system of FIGURE 1.

While the present invention has various applications, as indicated above, for purposes of illustration, it will be described as applied to the removal of water from natural gas coming directly from a gas well. This gas is ordinarily at a high pressure. It is passed through an absorber to remove at least some of the water before the pressure is reduced, so as to prevent freezing on expansion.

Referring to the drawings and first to the system shown in FIGURE 1, the reference character 1 designates a typical absorber of tray design with wet gas inlet 2 and dry gas outlet 3. The purpose of the system illustrated is to bring a liquid desiccant such as glycol into contact with gas in the absorber to remove water from the gas. Accordingly, the absorber 1 has a dry liquid absorbent feed line 4 to the top tray and a wet liquid absorbent outlet pipe 5. As the absorbent liquid flows through the absorber, it absorbs water from the gas. The usual absorbent is glycol, and will be so designated hereinafter. The wet glycol liquid and a small amount of gas, at absorber pressure, is used as the power fluid for pump P. These fluids are conducted to the pump through the pipe 5, which is provided with a throttle valve 6, and through the power fluid line 7. The portion of the pipe 5 within the absorber is turned upwardly to serve as a liquid overflow device.

Power fluid discharges from the pump through line 8, coils within heat exchanger 9, and then flows into flash tank 10. Flash tank 10 is equipped with a liquid level controller such as float 11, trunnion 12 and lever valve 13. Gas from the absorber may separate out in the flash tank 10, and be taken to auxiliary equipment through line 14. Pressure on the flash tank 10 is maintained by a back pressure valve 15. This valve permits the exhaust of excess gas to atmosphere sufficiently to control the pressure in the tank 10. Wet liquid glycol leaving flash tank 10 through lever valve 13 is conducted to a treating vessel or reboiler 16 through the flash tank discharge line 17. Water is driven out of the absorbent in the reboiler 16. Hot dry liquid glycol leaves the reboiler 16 through line 18, the shell of heat exchanger 9, and enters pump suction line 19. The pump P discharges into the absorber 1 through dry glycol feed line 4. Water, which has been removed from the wet gas in the absorber by the glycol, leaves the reboiler 16 as steam from the top of the reflux section 20.

It will be seen that with this system, liquid level is always maintained in the absorber at the point of overflow of the inner end of pipe 5. All of the water absorbed out of the gas leaves the absorber through the pipe 5, and all of the glycol liquid leaves the absorber through this pipe. In addition, some gas leaves the absorber through pipe 5.

The pump is of such design that it has two valves which control flow to the power cylinders, so arranged that the pump cannot stall.

Referring to FIGURE 2, the pump consists of a pump valve chamber 21, a pilot valve chamber 22, a left pumping chamber 23, a right pumping chamber 24, a left power chamber 25, a right power chamber 26, a left pilot chamber 27 and a right pilot chamber 28.

The pumping chambers and power chambers are in alignment and the arrangement is such that there are no stuffing boxes between the chambers and the atmosphere. Any leakage is only from one part of the pump to another.

The left power chamber 25 and the left pumping chamber 23 are separated by a left piston 30.

The right power chamber 26 and the right pumping chamber 24 are separated by a right piston 31. Pistons 30 and 31 are sealed within their respective cylinders by any suitable packing such as O rings 32. Pistons 30 and 31 are connected by a pump rod 33. The pump rod 33, movable longitudinally through the pump valve chamber 21, is sealed at each end of the chamber by a packing as shown by O rings 34.

The pump rod 33 has an enlarged portion or collar 35 at its longitudinal center and is designed to actuate the valve escapement cage 36. The cage 36 is free to slide along the pump rod 33 and is driven back and forth a predetermined relatively small distance compared to the piston travel. At each end of the stroke of piston and pump rod assembly 30—31—33, the cage 36 drives a conventional 4-way D slide vlave 37.

In the left position of the D slide 37, the left pilot chamber 27 is connected to the pump valve chamber 21 through the line 38, and the right pilot chamber 28 is connected to the power fluid discharge line 8 through line 39 and a branch line 40. In the right position of D slide 37, the left pilot chamber 27 is connected to the fluid discharge line 8 through line 38 and branch line 40; and right pilot chamber 28 is connected to pump valve chamber 21 through line 39.

A pilot plunger 41, movable longitudinally through pilot valve chamber 22, is sealed at each end of pilot valve chamber 22 by any suitable packing such as the O rings 42. The seals, provided by O rings 42, separate the pilot valve chamber 22 from the left pilot chamber 27, and separate the pilot valve chamber 22 from the right pilot chamber 28. The pilot plunger 41 drives a 4-way D slide 43. In the left position of the D slide 43, the left power chamber 25 is connected to the fluid discharge line 8 through the line 44 and a branch line 45 of the fluid discharge line 8; and the pilot valve chamber 22 is connected to the right power chamber 26 through a line 46. In the right position of the D slide 43, the left power chamber 25 is connected to the pilot valve chamber 22 through the line 44; and the right power chamber 26 is connected to the fluid discharge line 8 through the line 46 and a branch line 45 of the fluid discharge line 8.

In FIGURE 2, a speed control valve 47 is shown in line 44 and a speed control valve 48 in line 46.

The pump suction line 19 is connected to right pumping chamber 24 through check valve 49 in a branch line 50. Likewise, the suction line 19 is connected to the left pumping chamber 23 through a check valve 51 in a branch line 52.

The right pumping chamber 24 discharges through a check valve 53 in a branch line 54 of feed line 4, and the left pumping chamber 23 discharges through a check valve 55 in a branch line 56 of feed line 4.

In the operation of the pump, installed in the system as shown in FIGURE 1, fluid pressure is continuously supplied to pump valve chamber 21 and to pilot valve chamber 22. It will be noticed that the power fluid line 7 divides at the pump, one branch of this line, designated 58, going directly to the chamber 21, and the other branch, designated 57, going directly to the chamber 22. Thus, except for the pressure drop across the valve 6, which may be very small, the fluid pressure in the chambers 21 and 22 is the same as that in the absorber 1 at all times during the operation of the system, and will be referred to hereinafter as the "absorber pressure."

In FIG. 2, the parts are shown in the position they occupy just at the end of a stroke. The piston and pump rod assembly 30—31—33 has moved to the extreme left. The collar 35 has just actuated the valve cage 36 and D valve 37 to their left hand position. The plunger 41 is shown in this FIG. 2 as moved to the extreme right. It has just actuated the D valve 43 to its right hand position.

Just before the assembly 30—31—33 completed its left hand movement, the collar 35 had not yet moved the valve cage 36 and the valve 37, so that they were in their right hand position. Under these conditions, the plunger 41 and valve 43 were both in their left hand position.

With the valve 37 in the right hand position, and the valve 43 in the left hand position, the fluids flowing through the pump, substantially under absorber pressure, had been causing the assembly 30—31—33 to move to the left. The flow of these fluids was from the absorber 1 through the pipe 5, the valve 6, the pipe 7, branch 57, chamber 22, valve 48, line 46 and into the right hand chamber 26 thus causing the piston 31 to move. The valve 48 was so adjusted as to "meter" the flow through the line 46 and thus control the speed of movement of the assembly 30—31—33.

During the left hand movement of the assembly 30—31—33, the check valve 49 is closed and dry glycol is being displaced out of the right pumping chamber 24 through the check valve 53, branch line 54 and into the feed line 4. Except for the relatively small friction of flow, the right power chamber 26 and the right pumping chamber 24 are under absorber pressure. The check valve 55 is closed and dry glycol is being taken into the left pumping chamber 23 through the check valve 51 and the branch line 52. The left power chamber 25 is discharging to the power fluid discharge line 8 through the line 44, speed control valve 47, D slide valve 43 and branch line 45 of discharge line 8. Pressure drop across the pump rod 33 between the pump valve chamber 21 and the left pumping chamber 23 produces the force necessary to move pump rod assembly 30—31—33 to the left.

The pilot plunger 41 and D slide 43 are hydraulically locked in the left position by reason of the pressure drop across the left end of the pilot plunger 41. The pilot valve chamber 22 is at absorber pressure and the left pilot chamber 27 is at the reduced pressure of flash tank 10, being connected thereto through line 38, D slide valve 37 and branch line 40 of discharge line 8. No pressure drop exists across the right end of the pilot plunger 41, because the pilot valve chamber 22 is under absorber pressure and the right pilot chamber 28 is also under absorber pressure through line 39.

Since both liquid and gas are supplied to the pump through the overflow pipe 5, valve 6 and line 7, and since there is only a fixed amount of glycol liquid in the system, if there is but little liquid in the absorber, more gas than liquid will leave the absorber through pipe 5 and it will drive the pump to supply more liquid to the absorber. On the other hand, if there is considerable liquid in the absorber, very little gas will leave it through pipe 5.

It will thus be seen that dry glycol is being pumped to the absorber at a predetermined and automatically regulated rate.

As the piston and pump rod assembly 30—31—33 approaches the end of the stroke, the collar 35 on the pump rod 33 engages the valve escapement cage 36 which in turn contacts D slide 37. The D slide valve 37 is arranged for zero lap, that is the D slide has a narrow neutral position in which all of its ports are closed. As the D slide 37 is pushed to its neutral position during the first half of the final movement of the pump rod 33, no conditions of flow are changed. As the D slide 37 is pushed to its left position during the last half of the final movement, the right pilot chamber 28 is connected to the reduced pressure of the flash tank 10 through the line 39, D slide valve 37, branch line 40 and line 8. The left pilot chamber 27 is then subjected to the absorber pressure in the chamber 21 through line 38. The resultant pressure drop across the right end of the pilot plunger 41, produced by the difference in pressure in the pilot valve chamber 22 and the right pilot chamber 28, causes the pilot plunger 41 and D slide 43 to move to the right, where it is hydraulically locked until the position of D slide 37 is reversed. The parts are then in the positions shown in FIG. 2.

With the D slide 43 in the right position, the left power chamber 25 is connected to power fluid line 7 through the pilot valve chamber 22 and the line 44. Wet glycol and some gas, under absorber pressure, is now being "metered" through the valve 47 to cause the movement of the piston and pump rod assembly 30—31—33 to the right. The check valve 51 is closed and dry glycol is being displaced out of the left pumping chamber 23 through the check valve 55, branch line 56, and into the feed line 4.

Except for the relatively small friction of flow, the left power chamber 25 and the left pumping chamber 23 are now under absorber pressure. The check valve 53 is closed and dry glycol is being taken into the right pumping chamber 24 through the check valve 49 and the branch line 50 of line 19. The right power chamber 26 is discharging to the discharge line 8 through the line 46, speed control valve 48, D slide valve 43 and branch line 45 of the discharge line 8. The pressure drop across the pump rod 33, between the pump valve chamber 21 and right pumping chamber 24, produces the force necessary to move pump rod assembly 30—31—33 to the right. Except for the short time required to change the positions of the D slides 37 and 43, the pumping of dry glycol to the absorber is continuing at a constant rate. As the piston and pump rod assembly 30—31—33 approaches the end of its stroke to the right, the collar 35 on pump rod 33 engages the valve escapement cage 36 which in turn contacts D slide 37. As the D slide 37 is pushed to its right position, the left pilot chamber 27 is subjected to the reduced pressure of flash tank 10 through line 38, D slide valve 37, branch line 40 and line 8. The right pilot chamber 28 is then subjected to absorber pressure in pump valve chamber 21 through the line 39. The resultant pressure drop across the right end of the pilot plunger 41, produced by the difference in pressure in pilot valve chamber 22 and left pilot chamber 27, moves and hydraulically locks the plunger 41 and D slide 43 to the left.

With the D slide 37 in the right position and D slide 43 in the left position, the pump has completed a cycle of operation.

It will thus be clear that fluids flow through the power chambers of the pump under approximately the pressure of the absorber. They flow to the lower pressure in the flash tank 10 and the treating vessel 16. These fluids serve to drive the pump, and they always consist of three components, the absorbent itself, the constituent which has been absorbed out of the gas, and some portion of the gas.

The absorbent and the constituent are in liquid phase as they pass through the power chambers of the pump, and the energy which they deliver to the pump may be called the pressure-volume energy, being merely the product of the volume of liquid flowing and the difference in pressure between the absorber and the discharge line 8.

In the arrangement shown, the portion of gas which flows through the power chambers of the pump leaves the system from the flash tank 10, while the absorbed constituent leaves the system at the treating vessel 16. Variations in this portion of the system would, of course, be within the scope of the invention, so long as the absorbent is the only fluid flowing through the power chambers of the pump which is re-cycled or returned to the absorber.

The volume of power chambers 25 and 26 per unit of length is the product of the area of piston 30 or 31 and the unit of length. The volume of pumping chambers 23 and 24 is the product of the difference in areas, of piston 30 or 31 and the cross-sectional area of pump rod 33, and the unit of length.

In glycol systems such as here described, experience has shown that the pumping chamber volume divided by the power chamber volume has a practical working quotient of about 0.8. In some instances the glycol liquid gains as much as 10 percent in volume by absorbing water out of the gas. In accordance with the present invention, in order to control the liquid level in the absorber, the ratio of fluid volume pumped into the absorber to the total volume removed from the absorber is so set that some gas will always be taken from the absorber as power fluid.

If there were a 10 percent gain in volume in the absorber, the pump could be made to operate on a ratio of the order of 0.9 but at this ratio there would be some danger of flooding the absorber. By having the ratio of pumping chamber volume to power chamber volume at about 0.8, there is no danger of flooding the absorber. Yet at the same time, all of the pressure-volume energy in the absorbed water and all of the pressure-volume energy of the glycol is used, along with the small amount of gas, to drive the pump. Only enough gas is employed to insure against flooding.

Since the power fluid exhausting from the power chambers contains some gas, it appears in the flash tank at a reduced pressure. The arrangement is such that this gas constituting 10 to 20 percent by volume of the power fluid, does not freeze as it is expanded from the absorber pressure to the flash tank pressure because it is in the presence of a larger volume of liquid which gives up heat to the expanding gas. A quantity of low pressure gas is therefore available in the flash tank to operate pneumatic equipment which may be associated with the unit or to fire a boiler or reboiler.

Though speed control of the absorbent circulation can be set by throttling the power fluid flowing through the valve 6 in the line 7, it is better practice to use the two speed control valves 47 and 48 of FIGURE 2 for this purpose. Some absorbing liquids tend to emulsify and increase in viscosity to the point of plugging fixed orifices. Flow through the valve 6 is unidirectional, while flow through speed control valves 47 and 48 is reversed in each half-cycle of the pump. This reversing of flow through the valves 47 and 48 keeps them free from plugging. Thus, a constant rate of pumping is achieved with little likelihood of the system failing to operate.

Attention is also called to the fact that the pump is composed of only five moving parts or assemblies, contains no springs or trigger mechanisms, and has no seals exposed to the atmosphere.

While only one embodiment of the invention has been shown and described, it is obvious that various changes may be made without departing from the spirit of the invention or the scope of the annexed claims.

I claim:

1. In a system containing both gas and liquid, in combination, an absorber under pressure, a treating vessel under a lower pressure, means for supplying gas to said absorber, said gas containing a constituent capable of being absorbed, means for conveying gas from which the constituent has been removed away from the absorber, a conduit for supplying a liquid absorbent to the absorber, a fluid operated pump connected to said treating vessel and to said conduit for taking absorbent from said treating vessel and forcing it into said absorber, said pump having pumping chambers and power chambers, a liquid overflow device associated with said absorber and adapted to convey the absorbent, the constituent and some portion of unabsorbed gas from the absorber to the pump to drive the same, means for conveying the absorbent and the constituent from the pump to said treating vessel, and means for removing the constituent from the absorbent in the treating vessel.

2. The combination defined in claim 1 in which the ratio of the volume of the pumping chambers to the volume of the power chambers of said pump is such that the pressure-volume energy of the absorbent and the constituent are used to drive the pump, and in addition some unabsorbed gas from the absorber passes through the power chambers of the pump and is discharged from the system so as to insure against flooding of the absorber.

3. The combination defined in claim 1 in which the gas is natural gas coming from a well, the constituent is water and the absorbent is glycol and in which the ratio of the pumping chamber volume to the power chamber volume of the pump is about 0.8.

4. A method of removing a constituent from gas under pressure comprising the steps of circulating an absorbent through an absorber and a treating vessel, causing the gas to flow through the absorber and come in contact with the absorbent therein to cause the constituent to be absorbed in the absorbent from the gas, removing the constituent from the absorbent in the treating vessel, and utilizing the pressure-volume energy of the absorbent and the constituent flowing from the absorber to the treating vessel, and in addition some portion of the unabsorbed gas in the absorber, to pump the absorbent from the treating vessel into the absorber.

5. The method defined in claim 4 in which the portion of the unabsorbed gas from the absorber which is utilized to pump the absorbent is sufficient to insure against flooding of the absorber but not substantially more than enough to maintain a desired liquid level of absorbent in the absorber.

6. In a system containing both gas and liquid, in combination, an absorber under pressure, a treating vessel under a lower pressure, means for supplying gas containing a constituent capable of being absorbed to said absorber, a fluid operated pump for circulating absorbent through said absorber and said treating vessel and means for conveying the absorbent, the constituent and some portion of the unabsorbed gas in said absorber to the pump to drive the same.

7. The combination defined in claim 6 in which the pump has power chambers and pumping chambers in alignment, so that there are no stuffing boxes or pressure barriers exposed to the atmosphere.

8. The combination defined in claim 6 in which the pump has some cylinders, a pump valve chamber and pilot valve chamber, said valve chambers controlling flow of fluid to said power cylinders, and in which the means for conveying the absorbent, the constituent and some portion of the unabsorbed gas from the absorber to the pump divides, one branch going to the pump valve chamber and one branch going to the pilot valve chamber so that both valve chambers are subjected to substantially absorber pressure.

References Cited in the file of this patent

UNITED STATES PATENTS

| | | |
|---|---|---|
| 1,161,787 | Nickol | Nov. 23, 1915 |
| 1,898,637 | Lorraine | Feb. 21, 1933 |
| 1,968,655 | Rogers | July 31, 1934 |
| 2,241,717 | Robinson et al. | May 13, 1941 |
| 2,735,506 | Glasgow | Feb. 21, 1956 |
| 2,768,703 | Parks | Oct. 30, 1956 |
| 2,787,451 | Lavery | Apr. 2, 1957 |